2,863,482

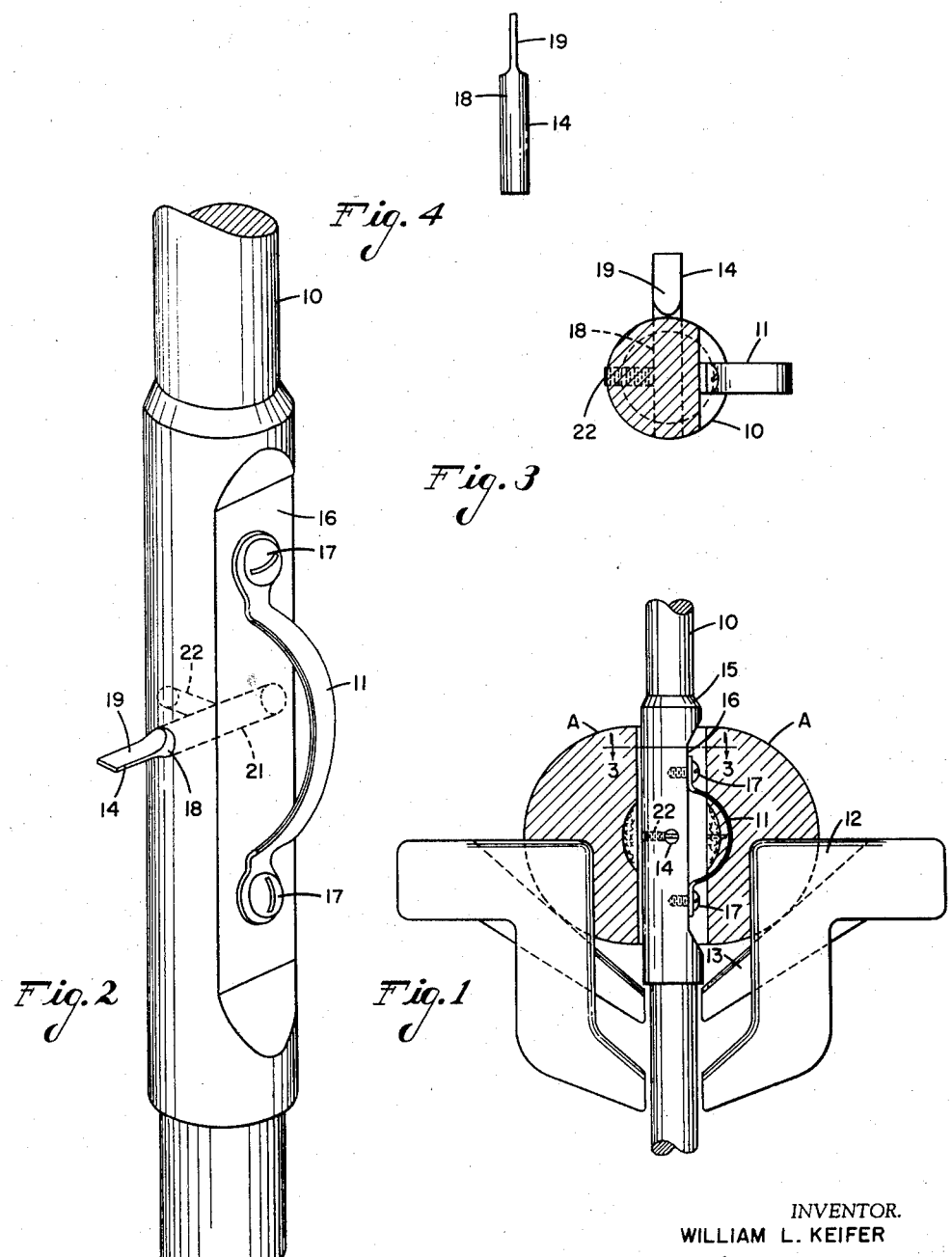
Dec. 9, 1958 — W. L. KEIFER — 2,863,482
PROCESS FOR SEED-CELLING APPLES AND THE LIKE
Original Filed July 12, 1956
INVENTOR.
WILLIAM L. KEIFER 0# United States Patent Office 2,863,482
Patented Dec. 9, 1958

PROCESS FOR SEED-CELLING APPLES AND THE LIKE

William L. Keifer, Lyons, N. Y., assignor to Comstock Foods, Inc., Newark, N. Y., a corporation of New York Original application July 12, 1956, Serial No. 597,433, now Patent No. 2,820,496, dated January 21, 1958. Divided and this application November 18, 1957, Serial No. 697,096

3 Claims. (Cl. 146—238)

The present invention relates to a method and to apparatus for seed-celling apples and similar fruits. The present application is a division of my application Serial No. 597,433, filed July 12, 1956, now Patent No. 2,820,496. The claims of my parent application are confined to the novel apparatus of the present invention; and the present application is restricted to my new process.

In the preparation of apples for cooking, canning and drying, it is customary practice to pare and core the apples. Then the apples are fed into a combined seed-celling and sliding machine for removal of the seeds and seed cells and for quartering the apples or dividing them into lesser divisions.

In conventional seed-celling and slicing machines, the cored apples are dropped over a rotating spindle, to one side of which the celling knife is secured. The slicing blades are mounted radially of the spindle and are located just beneath the celling knife. During the celling operation, the slicing blades enter partly into the apple and serve to hold it against rotation while the seed-cells are being removed. Immediately after celling is completed, the apple is forced through the slicing blades by another cored apple which is dropped into position on the slicing blades for celling.

The partial entrance of the slicing blades into the apple prior to the celling operation weakens the apple, and in some cases may result in the apple being split prematurely because of the outwardly expansive pressure exerted by the celling knife. This may occur particularly where the apple happens to be unusually soft and mellow. When an apple is thus split prematurely, it is usually broken up into a number of small, undesirable and possibly unusuable fragments.

After celling, the seeds and seed cells removed from the apple drop downwardly through the slicing blades with the apple itself, and generally are broken up into irregular large pieces by the slicing blades. The apple slices, seeds, and the large fragments of the seed cells are then screened in order to separate the desired apple slices from the undesired seeds, seed cell fragments, and any small pieces broken from the apple slices. With conventional celling techniques, the separation obtained by screening is seldom satisfactory, since the size of the undesirable portions is frequently larger than the size of the desired finished product. This is attributable partly to the incomplete separation between the large seed cell fragments and partly to a wide variation in the diameters of the whole fruit.

One object of the present invention is to provide a process for celling apples which will insure against premature splitting of the fruit, and which will assure a maximum yield of usable slices of the fruit.

Another object of the invention is to provide an improved method for celling apples and similar fruit which will reduce the fragments of seed cells to particles of small size, so that screening separation of the particles and the apple slices is facilitated.

A related object of the invention is to provide a method for seed-celling apples and similar fruit in which the normally outwardly directed expansive force exerted by the rotation of the celling knife is minimized, or even eliminated completely, thereby to prevent premature splitting of the apple attributable to the urging of the apple against the slicing knives by the heretofore normally-present, outwardly-directed expansive pressure of the celling knife.

Other objects of the invention will be apparent hereinafter from the specification and from the recital of the appended claims.

A preferred method of carying out the invention is illustrated in the accompanying drawings, in which:

Fig. 1 is a side elevation of one embodiment of the improved seed-celling assembly of the present invention, showing a cored apple impaled upon the slicing knives in position for celling according to the process of this invention;

Fig. 2 is a perspective view of the seed-celling knife assembly;

Fig. 3 is a section on line 3—3 of Fig. 1 looking in the direction of the arrows; and Fig. 4 is a side elevation of the halving pin.

Referring now in detail to the drawings, the numeral 10 denotes the rotary spindle of a seed-celling and slicing machine and having an enlarged portion 15. Mounted on a flat portion 16 of the spindle, which extends axially along the enlarged portion 15, is a semi-circular seed-celling knife 11, held in position by screws 17. A halving pin 14 is transversely seated in the spindle, angularly spaced 90° ahead of the celling knife in the direction of rotation of the spindle. A set screw 22 bears against the shank 18 of the halving pin and secures it in the recess 21 in the spindle. Below the celling knife, and extending radially outwardly from the spindle, are a set of slicing knives 12 and 13, in a conventional spider arrangement, but with alternate slicing knives 12 elevated above the other knives 13. The higher alternate knives impale and support an apple thereon during seed-celling without weakening its structure unduly.

The halving pin 14 has a thin, flat blade 19 projecting from its shank 18. The blade 19 extends radially outwardly from the spindle at least as far as the seed-celling knife 11. The pin is positioned vertically centrally of the span of the celling knife; and preferably, at the midpoint thereof.

For seed-celling, a previously-cored apple A is dropped downwardly on the spindle and is impaled on the higher slicing knives 12. This locks the apple in place and resists its tendency to rotate under the influence of the seed-celling knife 11.

With the apple A thus partially impaled, as indicated in Fig. 1, the halving pin 14 cuts a transverse, circular, disk-like swath centrally of the apple A as the spindle 10 rotates.

The flattened portion 19 of the halving pin 14 is as thin as practicable, consistent with satisfactory strength. Thus, as it moves in its circular path through the flesh of the apple, it exerts very little outwardly-directed expansive force on the apple. Nevertheless, it leaves in its wake an open swath roughly corresponding in thickness to the thickness of the flattened portion 19. Thus, when the seed-celling knife 11 moves through its arcuate path following after the halving pin, the flesh of the apple which is displaced by the seed-celling knife 11 is free to move inwardly, so that the outwardly-directed expansive force heretofore present in the seed-celling operation is eliminated for all practical purposes. In effect, the outwardly-directed expansive force of the seed-celling knife has been transformed into an inwardly-directed compressive force exerted against the seed-cells. The tendency to premature splitting of the apple which has characterized prior seed-celling apparatus and operations is therefore obviated.

After the spindle 10 has rotated through a celling cycle, the apple A is forced downwardly through the upper slicing knives 12, and the lower slicing knives 13 as another apple is pushed into place onto the upper slicing knives 12. As the apple A moves downwardly, the severed seed-cell portions of the apple are carried downwardly through the slicing knives.

The inward compressive force exerted by the seed-cell knife 11 is sufficient to cause some structural deterioration in the seed-cell portion of the apple, because of the weakening of this part of the apple by the halving pin 14. The subsequent passage of the seed-cells through the slicing knives causes breaking up of the seed-cell portion of the apple, while the remainder of the apple is divided into firm slices. Subsequent screening to separate the apple slices from the small, broken fragments of the seed-cell portion of the apple is considerably simplified and rendered more efficient by the extremely small size of the particles of the seed-cell portion. Furthermore, the increased frangibility of the severed seed-cell portion of the apple, caused by its halving and compression by the seed-celling knife, eliminates undesirable jamming of apple fragments between the seed-celling knife 11 and the underlying portion of the spindle 10, as has occurred in the past.

The 90° lead of the halving pin 14 ahead of the seed-celling knife 11 is important because of the disk-like hollow area which is formed in the seed-cell portion of the apple, which allows the force of the seed-cell knife to be directed inwardly as a compressive force, rather than outwardly as an expansive force. The relative positions of the halving pin and the seed-cell knife are quite important for satisfactory operation of the device. While a 90° spacing is preferred, substantially equally satisfactory results are obtained with angular spacings covering a fairly wide range. In practice, an angular range of about 30° up to about 120° has been found to give best results. The 90° spacing is preferred for the reasons set forth above, and also because maximum strength characteristics of the spindle 10 are utilized.

The invention is particularly useful where the apple being sliced happens to be soft and mellow, since even the slight entry of the slicing knives 12 into it may weaken its structure sufficiently for it to be apt to be split prematurely under the normally outward expansive pressure exerted by the conventional seed-celling knife 11. With the halving pin and the seed-cell knife assembly of the present invention, the force exerted by the seed-cell knife 11 is directed inwardly and the potential apple segments are not forced apart prematurely by being rammed onto the knives 12 during seed-celling.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. A method of separating seed-cells from previously cored fruit comprising cutting a circular transverse open path in the seed-cell portion of said fruit, then severing the seed-cell portion from said fruit by a cutting movement encompassing said seed-cell portion and the circular transverse open path therein.

2. The method of removing the seed-cell portion from a fruit, comprising bisecting the seed-cell portion thereof transversely, severing the seed-cell portion of said fruit by a cutting movement encompassing said seed-cell portion, and slicing said fruit to obtain fruit slices and particulate matter including small fragments of the seed-cell portion of the fruit.

3. The method of producing apple slices comprising cutting the seed-cell portion of a previously-cored apple transversely into at least two portions, severing the seed-cell portion from the cored apple by a cutting movement encompassing said seed-cell portion, and slicing the apple to obtain apple slices and particulate matter including small fragments of the seed-cell portion of the apple.

No references cited.